United States Patent

[11] 3,596,962

| [72] | Inventor | Adelbert F. Hertzell<br>5024 Lee Street, Skokie, Ill. 60076 |
|---|---|---|
| [21] | Appl. No. | 863,548 |
| [22] | Filed | Oct. 3, 1969 |
| [45] | Patented | Aug. 3, 1971 |

[54] SIDE BUMPER GUARD FOR AN AUTOMOBILE
4 Claims, 13 Drawing Figs.

[52] U.S. Cl.................................................. 293/1,
293/62, 293/74
[51] Int. Cl......................................... B60r 19/04
[50] Field of Search............................. 293/1, 62,
74, 99

[56] References Cited
UNITED STATES PATENTS

| 1,708,804 | 4/1929 | Schulman..................... | 293/62 |
| 1,753,483 | 4/1930 | Stevens....................... | 293/62 X |
| 2,212,493 | 8/1940 | Brunken...................... | 293/1 |
| 2,512,527 | 6/1950 | Hoffman...................... | 293/62 |
| 2,785,921 | 3/1957 | Barenyi....................... | 296/28 |
| 3,388,523 | 6/1968 | Evans........................... | 52/717 |

Primary Examiner—Drayton E. Hoffman
Assistant Examiner—Robert Saifer
Attorney—Olson, Trexler, Wolters & Bushnell ABSTRACT: A bumper guard assembly apparatus to be attached to an automobile comprising a bumper guard and means to move the bumper guard in one direction when the apparatus is in use and in an opposite direction when the apparatus is not in use, whereby the same need not be completely detached from the automobile at any time.

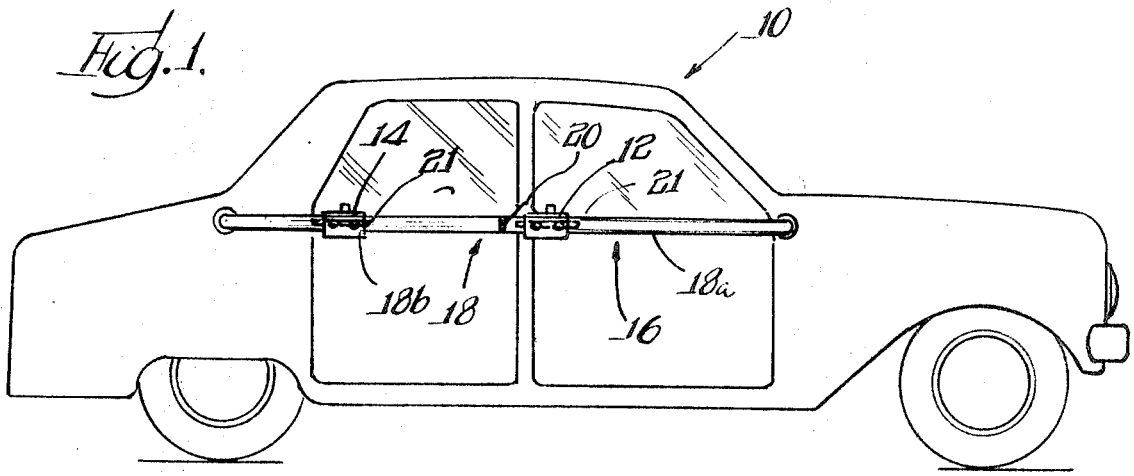
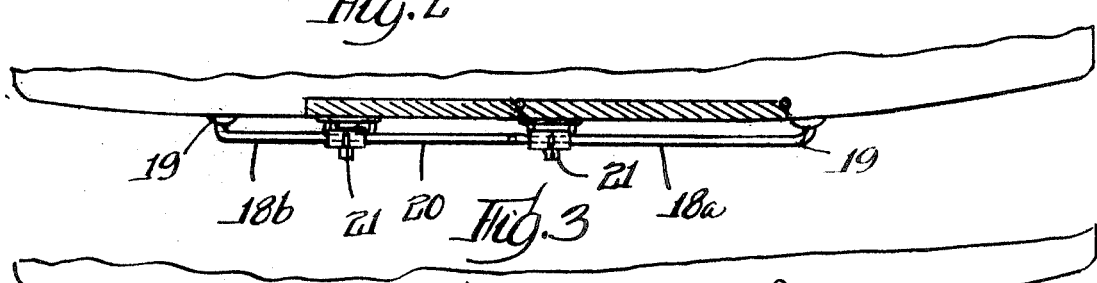
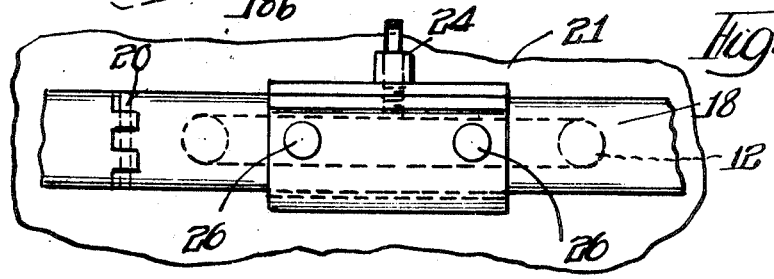
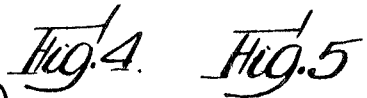
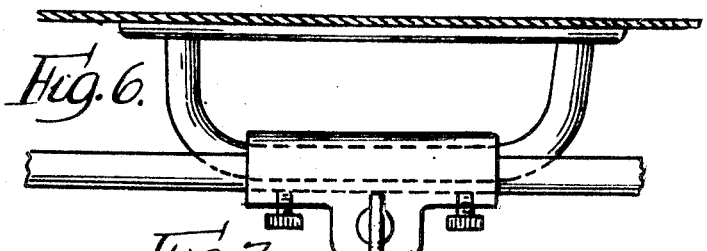
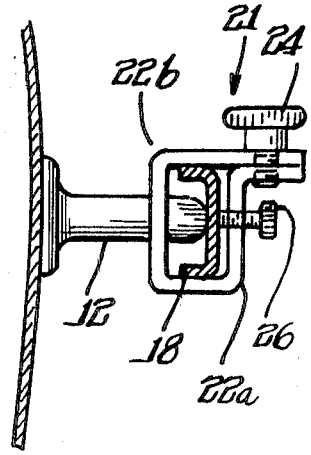
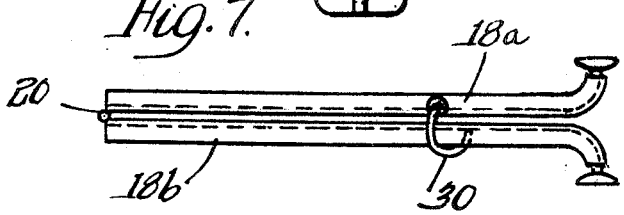

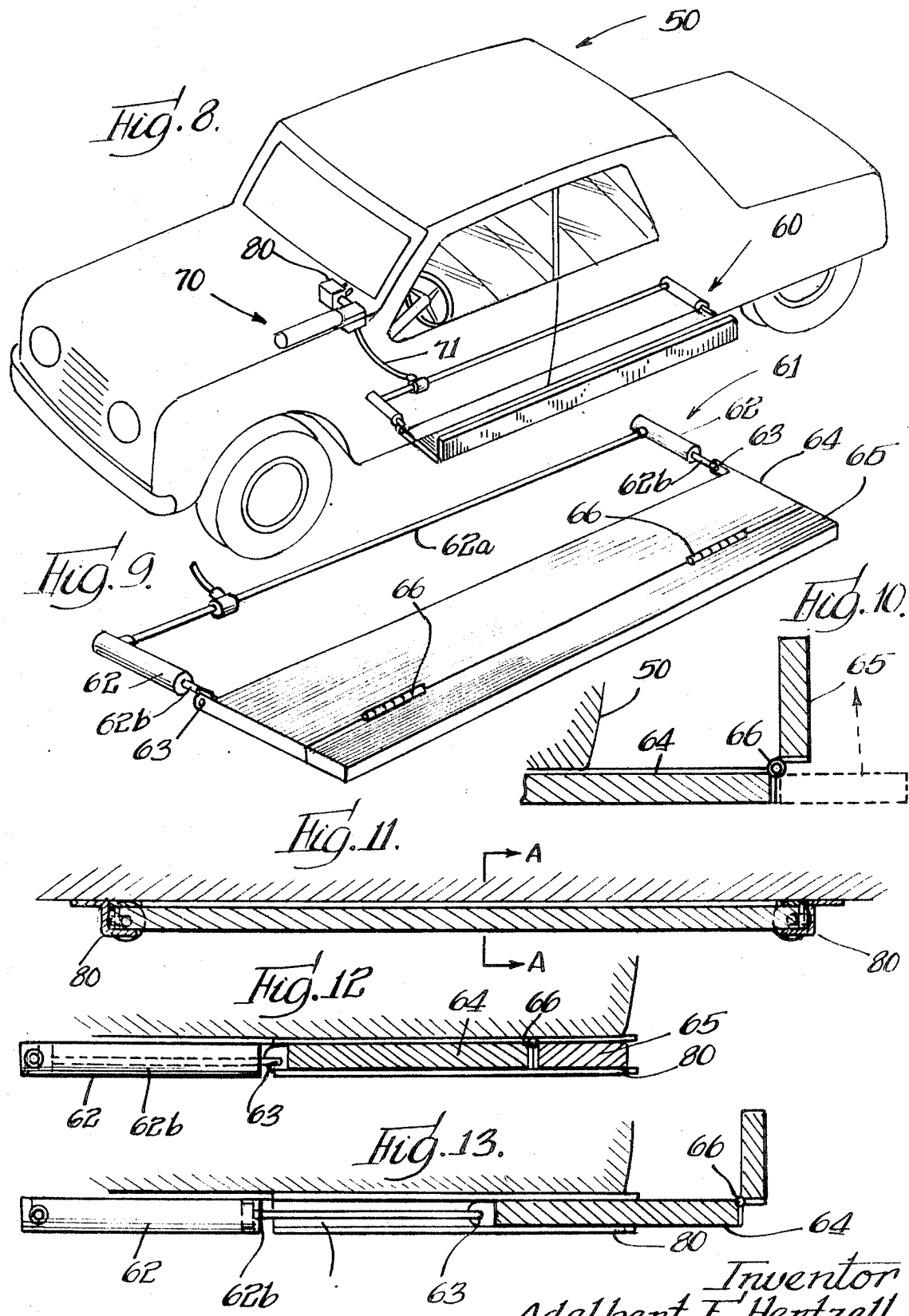

SIDE BUMPER GUARD FOR AN AUTOMOBILE

SUMMARY OF THE INVENTION

This invention relates broadly to protective devices for vehicles and more particularly to bumper guards which protect an automobile from scratches and dents due to external forces.

DISTINCTION OVER PRIOR ART AND OBJECTS

In the past, side bumpers for automobile bodies have been disclosed in accordance with U.S. Pat. No. 2,212,493. A common problem in the prior art bumper guard assemblies is the necessity to detach the bumper assembly from the car when the bumper is not used as a protective measure. This is necessary because the bumper structure does not allow entry into the auto while still attached. As displayed in U.S. Pat. No. 2,212,493, a bumper bar and its component parts are affixed to the side of an automobile by rigidly attaching a clamp to the door handle of the car. The bar which is made of one section extends across the side of the car preventing access therein by means of the car doors. In order for one to enter the car through the doors, the bumper structure necessitates complete removal of the bar and its component parts from the side of the car. This not only causes the inconvenience of requiring complete removal but also necessitates the added inconvenience of storing of the bumper structure while the automobile is in use.

Therefore, a general object of the present invention is to provide an improved side bumper for an automobile which overcomes the limitations of the prior art by providing a foldable bumper assembly which does not necessitate detachment from the automobile while the bumper assembly is not in use.

The bumper guard assembly herein claimed and disclosed comprises generally a section which may be semipermanently affixed to a portion of an automobile and a second section which is movably affixed to the first section such that the movable section may be moved in one direction when body protection is desired and in an opposite direction allowing access into the automobile when body protection is no longer desired.

In a first embodiment, a longitudinal bar is affixed to the side of an automobile. The bar is made up of two sections one of which is pivotably hinged to the other. The two sections of the bar are attached to the door handles of the automobile (if the automobile is a four-door model) by a clamp on each section. One of the clamps may be easily removed so that it is free to pivot about the hinge in a semicircle away from the side of the automobile. This allows the two sections of the bar to be folded together so that free access into the car may be obtained without completely detaching the bumper assembly from the side of the car.

A second embodiment utilizes a bumper guard assembly which is permanently fastened to the underside of an automobile. The assembly particularly comprises a baseboard and subbaseboard which may be moved from a position entirely under the automobile when not in use to a position protruding out from the side of the automobile when it is desired to use the assembly as a protective device. When the baseboard and subbaseboard are no longer to be so used, they may, by appropriate means, b moved back into their original position underneath the automobile by an appropriate actuation device.

In both of the embodiments as generally discussed above, it can be seen that there is no necessity to remove the bumper guard structure from the automobile when not in use. It can also be seen that this will not hinder free access into the automobile when so desired.

Additional objects and features of the invention will be apparent from the detailed disclosure which follows.

BRIEF DESCRIPTION OF FIGURES

In the drawings, FIG. 1 is a side view of a four-door automobile with the bumper guard assembly attached to the two side door handles according to a first embodiment;

FIG. 2 is a top view of the side of an automobile with the bumper guard attached in the protective position;

FIG. 3 is a top view of the side of the automobile with one section of the bumper guard partially pivoted away from the side of the automobile;

FIG. 4 is a detailed side view of the clamp utilized to fasten the bumper guard to the door handle of the automobile;

FIG. 5 is a front view of the clamp specifically showing adjustment screws which are used to position the clamp on an appropriate part of the bar for alignment with the door handle;

FIG. 6 is a top view of the clamping means as attached to the door handle. The adjustment screws can be seen extending away from the side of the automobile;

FIG. 7 is a top view of the bumper guard in its folded position with a leather band snap means fastened around both sections to prevent the movable section from pivoting back into its protective position;

FIG. 8 is a perspective view of an automobile with a bumper guard, of the second embodiment, attached on the underside of the automobile. The bumper guard assembly is in its protective position with its power source and control means in an accessible position located on the automobile;

FIG. 9 is a perspective view of the bumper guard assembly alone;

FIG. 10 is a side sectional view of the assembly in both its protective and unprotective (dashed lines) position;

FIG. 11 is a side view of the underside of an automobile with the bumper guard assembly in its retracted position;

FIG. 12 is a front sectional view of the underside of the automobile showing the bumper guard assembly in its nonprotective position taken along the line A–A of FIG. 11; and FIG. 13 is the same as FIG. 12 except the bumper guard assembly is in its protective position.

DETAILED DESCRIPTION

Referring now in detail to the drawings and specifically to FIG. 1 which is a side view of an automobile 10 having four doors, two of which are shown as including door handles 12 and 14. Attached to the door handles 12 and 14 and extending long the side of the automobile is the bumper guard assembly 16 as shown in its protective position.

The bumper guard assembly comprises a sectional bar 18 made up of two sections 18a and 18b connected together by hinge 20 in such a fashion as to allow either section to pivot with respect to the other. Both sections are affixed to the car handles 12 and 14 respectively by means of clamps 21 while the assembly is in its protective position. Only one clamp would, of course, be necessary if the assembly were attached to a two door automobile. A small portion at each end of the bumper bar 18 curves in as shown in the drawings. At each end thereof is a resilient padding 19 to protect the automobile from being scratched by the bumper bar.

The clamp 21, shown in greater detail in FIGS. 4, 5 and 6, comprises two sections 22a and 22b which when fitted together form a closed rectangular loop as shown. The two sections are secured together by clamping screw 24 which is threaded through holes of the respective sections. The clamp 21 further includes adjustment screws 26 which fit into threaded holes located on section 22a of the clamp. These adjustment screws when in their loosened position allow the clamp to be slid along the bumper bar 18 so that the clamp may be properly aligned with the door handle of the automobile.

The procedure in mounting the bumper guard assembly to the door handle is quite simple. Section 22a of the clamp is moved along the bar 18 to align the clamp section with the door handle of the automobile. Section 22b of the clamp is then placed through the door handle and bumper bar as shown in FIG. 4 and secured to section 22a by clamping screw 24. Adjustment screws 26 are then tightened so that bar 18 is rigidly affixed to the door handle, thus preventing the clamp and entire bumper from further movement.

Different positions of the bumper guard assembly as attached to the side of the automobile are displayed in FIGS. 2, 3 and 7. Specifically, FIG. 2 shows the bumper guard assembly in its protective position. The bar 18 with both of its sections 18a and 18b extends in its elongated position across the entire side of the automobile. A clamp 21 is located on each section 18a and 18b fastening the entire structure to both door handles. When it is desired to enter the car, the bar section 18b (or 18) is unclamped from its associated door handle and pivoted about its hinge 20 away from the side of the automobile and towards bar section 18a (or 18b) as can be seen in FIG. 3. When bar section 18b has been entirely pivoted away from the automobile and is resting adjacent to bar section 18a, as shown in FIG. 7, a leather band strap means 30, which is permanently affixed to bar section 18a (or 18b) is looped around section 18b and thereafter snapped forming a closed loop thus preventing section 18b from pivoting back into its former position. The assembly is now so positioned as to allow free entry into the automobile. The leather band strap means is merely an elongated strap of leather or other suitable material which is permanently attached at its center to one of the bar sections. The ends of the strap contain the male and female parts of a snap respectively. The strap is merely looped around the bar section which it is not attached to when the latter is in its completely pivoted position. The strap is then snapped to lock the sections together (the details of the leather band snap means are not shown).

It becomes readily apparent from the above discussion that an automobile operator can easily attach a bumper guard assembly of the above discussed embodiment otto the side of his automobile to protect his automobile from the common disasters of parking lots and also to permit entry into the automobile without removal of the assembly. The only thing required by the operator (with respect to a four-door automobile) is to detach the clamp secured to one of the door handles and to fold over the associated bar section as discussed above. It should be noted that the bar guard assembly as discussed above is also applicable to a two-door automobile and is merely clamped to the one side door handle. This allows the operator even greater ease since there is no second clamp to be removed.

Referring now to FIGS. 8 through 13, a second embodiment of a bumper guard assembly is shown. FIG. 8 specifically displays an automobile 50 in combination with the bumper guard assembly 60, power source 70 and control valves 80 which supply power to and move the bumper guard assembly 60. As shown in FIG. 8 in its protective position the bumper guard assembly is attached to the underside of the automobile with a portion extending out from beneath the automobile. The power source 70 may be located in a convenient position within the automobile as shown with power leads 71 extending from the power source to the bumper assembly 60. The controls 80 are conveniently positioned on the automobile for easy actuation from outside the automobile.

Details of the bumper assembly 60 may be seen in FIGS. 9 and 10. The assembly comprises a drive element 61 which includes pneumatic cylinder and piston assemblies 62 connected together by an airline 62a. The pistons 62b of the assemblies 62 are operatively connected at point 63 to the ends of a flat rectangularly shaped baseboard 64. The rectangular baseboard 64 lies in a flat position parallel with the ground. A similarly shaped subbaseboard 65 is attached to the side of the baseboard 64 away from drive element 61 by means of two spring hinges 66. The spring hinges 66 bias subbaseboard 65 in a vertical and perpendicular position with respect to the baseboard. FIG. 10 specifically shows the subbaseboard 65 tending to go from its forced-down position (dashed lines) to its natural position (solid lines), the spring-urged pivoting being indicated by the arrow.

In operation, when the drive element 61 is energized by actuation of control valves 80 in the airline 62a pistons 62b, which are directly attached to the baseboard at point 63 are moved in an inward and outward direction thus moving the baseboard and subbaseboard in a direction to and away from the drive element. When the baseboard 64 and subbaseboard 65 are moved away from the drive element 61 by pistons 62b the bumper guard assembly is in its protective position. As shown in FIG. 8 a portion of the baseboard and the entire subbaseboard extend out from beneath the side of the automobile and the subbaseboard is thus free to move into its biased position due to the biased spring hinges 66. When it is desired to free the automobile from bumper guard protection, the drive element 61 is actuated to move the baseboard and subbaseboard in a direction towards the driving element such that the entire baseboard and subbaseboard in its vertical perpendicular position with respect to the baseboard moves towards the drive element and therefore the automobile, the subbaseboard comes in contact with the protruding portion of a channel 80 on which it rides and continued movement inward thus forces the subbaseboard into its inactive or storage position parallel to the baseboard. Further movement towards the drive element completely hides the baseboard and subbaseboard beneath the automobile.

Details of how the baseboard 64 and subbaseboard 65 are moved away from and to the drive element 61 are shown in FIGS. 11, 12 and 13. Attached to the underside of the automobile and protruding out thereof are channels 80 which are so positioned to allow the baseboard 64 and subbaseboard 65 to ride along the channels away from and towards the drive element 61. The drive element 61 is attached to the underside of the automobile in a conventional manner. FIG. 12 specifically shows the bumper guard assembly in its retracted position with the baseboard and subbaseboard located completely under the automobile. FIG. 13 shows the bumper guard assembly in its protective position with baseboard 64 partially beneath the car and partially extending outward along the channels 80 with the subbaseboard 65 completely out from beneath the automobile and in its biased position.

From the above discussion of a second embodiment of the bumper guard assembly herein disclosed, it can be seen that there is no necessity to remove the assembly entirely from the automobile when the assembly is not to be used as is the case in the prior art. While outside of the automobile, mere actuation of control valves which are located in an accessible position will move the entire structure to a position completely beneath the automobile and thus allow free access into the automobile. When bumper guard protection is desired, a mere flick of the control switch will transport the portion of the bumper guard assembly out from beneath the automobile as discussed above and thus protection is attained.

While particular embodiments of the invention have been shown, it should be understood of course that the invention is not limited thereto since many modifications such as electric or manually controlled drive elements may be made and it is therefore contemplated to cover by the present application any such modifications as fall within the true spirit and scope of the appended claims.

What I claim is:

1. Bumper guard assembly apparatus to be attached to an automobile comprising: a bumper guard including a plurality of sections, and means to movably attach said sections together whereby each section may be moved in one direction relative to the other sections when said bumper guard assembly is in use with at least one section disposed adjacent to a door of the vehicle and preventing access thereto and moved in an opposite direction when said bumper guard assembly is not in use and permitting access to said door whereby said assembly need not be completely detached from said automobile at any time.

2. Bumper guard assembly apparatus to be used in combination with an automobile body adjacent to a door thereof, comprising: a bumper bar attachable to the side of said automobile and clamping means connected thereto to attach said bumper bar to said automobile, said bumper bar having relatively movable sections whereby each section may be shifted from an operative position across the door to an inoperative position clearing the door and in which each section maybe folded relative to the other section while still leaving the assembly attached to the automobile, and means for retaining each section in its inoperative position.

3. Bumper guard assembly apparatus to be used in combination with an automobile body, comprising: a longitudinal foldable bumper bar attachable to the side of said automobile and clamping means connected thereto to attach said bumper bar to said automobile whereby said bumper guard assembly need not be removed from said automobile when access into the automobile is desired, said foldable bumper bar comprising two sections hinged to each other whereby each of said sections may be pivoted from a position extending in alignment with said other section to a position adjacent said other section, and means for locking said sections together when positioned adjacent to each other.

4. Bumper guard assembly apparatus to be used in combination with an automobile body, comprising: a longitudinal foldable bumper bar attachable to the side of said automobile and clamping means connected thereto to attach said bumper bar to said automobile whereby said bumper guard assembly need not be removed from said automobile when access into the automobile is desired, said clamping means consisting of two separate clamping elements which when secured together form a loop which may be secured to the door handles of said automobile; a clamping screw to secure said separate elements together; and adjustment screws located on one of said elements whereby said clamping means may be adjustably attached to said bumper bar ands said automobile door handle.

UNITED STATES PATENT OFFICE
CERTIFICATE OF CORRECTION

Patent No. 3,596,962         Dated August 3, 1971

Inventor(s) Adelbert F. Hertzell

It is certified that error appears in the above-identified patent and that said Letters Patent are hereby corrected as shown below:

Column 1, line 62, change "b" to --be--;

Column 2, line 42, change "long" to --along--;

Column 3, line 9, change "(18)" to --(18a)--;

Column 3, line 31, change "oto" to --to--;

Column 4, line 12, after "subbaseboard" insert --lie completely beneath the automobile. As the sub-baseboard--;

Column 6, line 14, change "ands" to --and--.

Signed and sealed this 18th day of April 1972.

(SEAL)
Attest:

EDWARD M. FLETCHER, JR.         ROBERT GOTTSCHALK
Attesting Officer               Commissioner of Patents